United States Patent
Halloran et al.

(10) Patent No.: US 10,345,051 B1
(45) Date of Patent: Jul. 9, 2019

(54) GROUND SOURCE HEAT PUMP HEAT EXCHANGER

(71) Applicants: Roy Dan Halloran, Charleston, WV (US); Don R. Richardson, Charleston, WV (US)

(72) Inventors: Roy Dan Halloran, Charleston, WV (US); Don R. Richardson, Charleston, WV (US)

( * ) Notice: Subject to any disclaimer, the term of this patent is extended or adjusted under 35 U.S.C. 154(b) by 0 days.

(21) Appl. No.: 13/838,388

(22) Filed: Mar. 15, 2013

Related U.S. Application Data (60) Provisional application No. 61/657,898, filed on Jun. 11, 2012.

(51) Int. Cl.
| | |
|---|---|
| *F24J 3/08* | (2006.01) |
| *F28F 9/04* | (2006.01) |
| *F28F 1/00* | (2006.01) |
| *F28D 20/00* | (2006.01) |
| *F28F 21/08* | (2006.01) |
| *F28F 21/06* | (2006.01) |

(52) U.S. Cl.
CPC ............ *F28F 1/00* (2013.01); *F28D 20/0052* (2013.01); *F28F 21/06* (2013.01); *F28F 21/084* (2013.01); *Y02E 10/12* (2013.01)

(58) Field of Classification Search
CPC ... F28D 20/0052; Y02E 10/125; Y02E 10/12; F28F 21/084; F28F 21/06; F28F 1/00
USPC .............................................. 165/178, 58, 45
See application file for complete search history.

(56) References Cited

U.S. PATENT DOCUMENTS

| | | | | |
|---|---|---|---|---|
| 2,211,813 | A | * | 8/1940 | France-Ferreira ... B21D 53/085 165/144 |
| 4,257,239 | A | * | 3/1981 | Partin et al. ................. 62/238.7 |
| 4,409,798 | A | * | 10/1983 | Yuan ............................... 62/260 |
| 4,993,483 | A | * | 2/1991 | Harris ...................... F24J 3/083 165/104.11 |
| 5,054,541 | A | * | 10/1991 | Tripp .............................. 165/45 |
| 5,224,357 | A | * | 7/1993 | Galiyano et al. ............... 62/260 |
| 5,339,890 | A | | 8/1994 | Rawlings |
| 5,461,876 | A | * | 10/1995 | Dressler .......................... 62/160 |
| 5,533,355 | A | | 7/1996 | Rawlings |
| 5,560,220 | A | * | 10/1996 | Cochran ................... F24J 3/083 165/45 |
| 5,651,265 | A | | 7/1997 | Grenier |
| 5,946,928 | A | * | 9/1999 | Wiggs ............................. 62/260 |
| 6,499,772 | B1 | * | 12/2002 | Minemyer ............ F16L 37/138 285/308 |
| 7,146,823 | B1 | * | 12/2006 | Wiggs ............................. 62/260 |
| 7,213,649 | B2 | * | 5/2007 | McNair et al. ............... 166/302 |
| 7,578,140 | B1 | * | 8/2009 | Wiggs ............................. 62/260 |

(Continued)

*Primary Examiner* — Jason N Thompson
(74) *Attorney, Agent, or Firm* — Johnston Holroyd; Mary-Jacq Holroyd (57) ABSTRACT

A heat pump, heat pump exchanger component, and method of using a heat exchanger, the heat pump exchanger has long pipes arranged in at least one layer in fluid communication with one another, and spaced a minimum of about two (2) feet apart. Shorter pipes may be disposed between long pipes, and connectors between adjacent pipes. The long pipes are composed of high thermal conductive materials, such as aluminum, while the short pipes and/or connectors may be composed of flexible lower thermal conductive materials. Heat exchanger is placed a minimum of twenty-four (24) inches beneath the ground surface.

19 Claims, 7 Drawing Sheets

(56) References Cited

U.S. PATENT DOCUMENTS

| | | | |
|---|---|---|---|
| 2005/0045318 A1* | 3/2005 | Hoeks | 165/172 |
| 2005/0061472 A1* | 3/2005 | Guynn | F24J 3/083 |
| | | | 165/45 |
| 2007/0061104 A1* | 3/2007 | Nagano et al. | 702/182 |
| 2008/0060786 A1* | 3/2008 | Warnelov et al. | 165/45 |
| 2008/0289795 A1* | 11/2008 | Hardin | F24J 3/083 |
| | | | 165/45 |
| 2009/0084519 A1* | 4/2009 | Panula et al. | 165/45 |
| 2010/0025008 A1* | 2/2010 | Walford | 165/45 |
| 2010/0258266 A1 | 10/2010 | Stojanowski | |

* cited by examiner

GROUND SOURCE HEAT PUMP HEAT EXCHANGER

RELATED APPLICATIONS

This application claims the benefit of U.S. Provisional Application Ser. No. 61/657,898 entitled "Horizontal Ground Source Heat Pump Heat Exchanger" filed on 11 Jun. 2012, the contents of which are incorporated herein by reference in its entirety.

BACKGROUND OF THE INVENTION

The principle of the heat pump was initially proposed by Nicholas Carnot in 1824. Thirty years later, Lord Kelvin suggested refrigerating equipment could be used for heating. Although several manufacturers built heat pumps in the 1930s, it was not until the 1950s that heat pumps began to be mass produced. Conventionally, the heat was exchanged with the ambient outside air, and refrigerants, e.g., hydrocarbons or fluorocarbons, were used in the process. The use of refrigerants, such as hydrocarbons or, proved to have a negative environmental impact. Today, numerous types of heating and cooling systems are used for controlling the temperature of various thermal loads, and efforts are made to minimize pollutants in the environment. Many existing heating and cooling systems, including heat pumps, air conditioners, refrigeration units, and the like, operate on the same thermodynamic principles and utilize the same basic components.

Most commonly, these basic components include a compressor, an expander, a load heat exchanger, and an external heat exchanger. Each of these components is connected with a piping system which carries a circulating fluid, e.g., a refrigerant (liquid or gas) or water (or an antifreeze or alcohol water solution) throughout the system. In order for this type of system to operate, heat must be exchanged with the environment. This heat exchange with the environment may be accomplished by directing the circulating fluid to an outdoor coil, e.g., an external heat exchanger, where thermal energy is exchanged between the water/refrigerant contained in the coils and the outside air.

Using outside air as the sink or source for a heat exchange process is problematic due to the variability of air temperature. A heat pump operating during the winter requires the external heat exchanger to absorb thermal energy from the outside air. The heating system, however, loses its efficacy and efficiency as the outside temperature falls because less thermal energy can be extracted from the outside air, and therefore, these heating systems must have a secondary heat back up, e.g., electric heating strips. Similarly, a cooling system, such as an air conditioner, encounters the same efficacy and efficiency problems when the outside temperature rises.

A ground source heat pump works like other heat pumps in that it has a basic refrigerating circuit but, instead of extracting energy from the air, it uses the heat stored in the ground. Ground source heat exchange is a potentially more efficient and effective way to perform the external heat exchange required by many heating and cooling systems. Unlike air temperatures, the ground temperature is a relatively constant temperature that ranges from about 44° F. to about 76° F. at a depth below the local frost line. Additionally, the ground can act as a virtually limitless energy source or heat sink.

Currently, plastic pipe is typically used with ground source heat pumps, and is buried in the earth, or disposed in lakes, rivers, ponds, water wells, and the like. Copper coils containing refrigerants, and flat steel plates disposed in rivers, lakes, and ponds, are also used. In using plastic tubing, or pipes, one method is to install the pipes horizontally with a trencher or back hoe. This requires 350' per ton of heat pump, e.g., a five ton heat pump needs 1750' of pipe and trench. Examples contained herein regarding pipe length and pipe and trench length figures throughout are for the average annual ambient temperatures of Charleston W. Va. These figures will vary for other locations based upon average annual ambient temperature. In general, two basic types of connecting horizontal loop arrangements are utilized, which include connecting a closed loop in series so that only one long loop is present and in parallel so that several loops are disposed to use the same input/output pipes. Vertical loops are also installed by a drilling machine in either a parallel or series configuration, which requires a 150' to 225' of borehole per ton of heat pump which requires a pipe length of 300' to 450' per ton of heat pump.

Although, ground source heat pump heating and cooling systems generally include many of the same essential components as other heat pump heating and cooling systems, except that the external heat exchanger operates in a different manner. The external heal exchange process of a ground source heat pump heating or cooling system is generally accomplished by one of two methods. One method is simply to extend the refrigerant fluid carrying coil into the soil, thereby directly exchanging heat with the ground, e.g., a direct expansion (DX) refrigerant loop. The second method utilizes a circulating heat exchange fluid, e.g., water or other aqueous solution, to carry thermal energy between the ground and the refrigerant heat exchanger and on the the thermal load. Typically, this circulating heat exchange fluid travels in a piping system between a subterranean heat exchanger, where heat is exchanged with the ground, and the refrigerant heat exchanger and on to the thermal load, where heat is exchanged with the heating or cooling system. When the water/refrigerant carrying coil of the heating or cooling system contacts this circulating heat exchange fluid, heat is exchanged directly with the circulating heat exchange fluid and, thereby, indirectly with the ground.

Most existing ground source heating and cooling systems use a circulating heat exchange fluid to transfer heat between the system and the ground. Heretofore, geothermal systems of this type typically employ small size polyethylene pipe(s), and a dedicated loop field to service each individual thermal load. Most of these heat exchange loops are oriented vertically extending down into the earth. This limits the contractors who can install these systems and creates a muddy water mess at the ground surface which is unacceptable at many locations potentially increasing the cost of the installation. Where horizontal loops are used, they tend to require a large surface area. The heat exchangers with small sized polyethylene pipe loops that are oriented horizontally are typically buried four or more feet beneath the ground surface, and take up a great deal of surface area. Many locations are inadequate in surface area size to accommodate these horizontal loops.

Direct exchange geothermal heat pumps use a single loop circulating refrigerant through tubes that are in direct contact with the ground. The refrigerant circulates through a loop of copper tube buried underground, and exchanges heat with the ground. Water-source, and water loop, heat pumps are considered different because they use water or a water antifreeze mixture. Most such systems have two loops, including a primary refrigerant loop that is contained in the heat pump cabinet where it exchanges heat with a secondary water loop that is buried. The secondary loop is typically made of high-density polyethylene pipe containing a mixture of water and anti-freeze, such as propylene glycol, monopropylene glycol, denatured alcohol, methanol, or the like. After leaving the internal heat exchanger, the water flows through the secondary loop outside the building to exchange heat with the ground before returning. The secondary loop is placed below the frost line, or submerged in a body of water, or well, if available. Ground moisture aids in the heat exchange, and therefore, where the ground is naturally dry, sprinkler (or soaker) hoses may be buried with the ground loop to keep it wet.

Efforts to devise modular geothermal heat exchangers have been made in the past, but these devices tend to be too large for small homebuilders, do-it-yourself homeowners, for temporary or seasonal habitats, or the like because these devices typically require deep/long trenches or large bodies of water in which to place the heat exchanger. U.S. Pat. No. 5,224,357 teaches a ground source heat exchanger having modular tube bundles adapted to be placed within narrow excavation in the group that also utilizes thermal conductive materials such as metals, and more specifically, copper or aluminum; however, that device is quite different from the present invention having many more coils of tubing in each modular bundle, and the bundles requiring much deeper trenches. A source of water, such as a soaker hose, is disclosed to maintain proper moisture levels directly above the modular bundles.

Similarly, U.S. Pat. No. 5,339,890 teaches a modular ground source heat pump system with subterranean piping installation constructed of a plurality of modular heat exchange units, which utilizes a tube within an insulated tube structure that requires deep holes, long trenches, wells, or bodies of water. Another patent along the same design is U.S. Pat. No. 5,533,355 which teaches a ground source heat pump system wherein modular heat exchange units are utilized. These systems are limited to using a parallel connection system to the inlet/outlet piping instead of having the option of the modular units generating a single coil with the separate modules operating in series.

U.S. Pat. No. 5,651,265 teaches a more conventional ground source heat pump system with an internal heat exchanger and an arrangement of check valves to permit a single direction of refrigerant flow in both the heating and cooling modes. The system charge is the same for heating and cooling and the ground coil consists of a plurality of three pipe units—one pipe for inflow and two for out flow. US Patent Application No. 2010/0258266 teaches a modular system with dual loops, an inner loop disposed within a contained cylinder.

Each of these inventions require a great deal of space, a large body of water, or at least one very deep borehole, and as such, are difficult for your average consumer to utilize. As such, conventional ground source heat pumps tend to be used by businesses or property owners with lots of resources and large lots, because of the extra space required, and the high cost of installing conventional ground source heat exchangers.

SUMMARY OF THE INVENTION

The present invention relates to the field of ground source heat pump heating and cooling systems, and more specifically, to a compact circulating heat exchanger loop component, a ground source heat pump in fluid communication with at least one compact circulating heat exchanger loop component, and method of installation and use.

Alternative designs of the invention include a ground source heat pump earth heat exchanger that is a horizontally oriented water/fluid loop ground heat exchanger having a pipe bundle containing two or more layers of horizontally oriented long pipes, which upon assembly are in closed fluid communication with an output and an input. The output and input form a closed loop when attached to the corresponding output and input of the heat pump. Water, or an antifreeze/water solution, is pumped through the closed loop to alternatively exchange heat with the ground or heat pump as appropriate.

The long pipes are composed of highly thermal conductive materials, such as metal, e.g., aluminum, copper, or alloys thereof, or steel or other alloys. This loop component may be combined with additional loop components to create a larger loop system with more than one loop component in fluid communication with one another in series or in parallel. The thermally conductive long pipes are spaced a minimum of about two (2') feet apart from one another under all circumstances to prevent undesirable thermal interference between adjacent pipes.

In an embodiment of the present design, a first layer of horizontally oriented pipes are spaced a minimum of about two (2') feet apart from one another, and about twenty (24") to about thirty (30") inches from the surface of the ground. In very cold climates, the distance required beneath the surface may be greater due to a deeper frost line, but typically about the same level as the local requirements for the depth of the foundation of a structure or a house.

Alternatively, a heat exchanger loop component may be disposed vertically with long pipes oriented up and down with short tubes disposed at least two (2') feet under the ground surface. Although a greater total depth will be required, the vertically oriented heat exchanger will have an even smaller foot print. Multiple components disposed vertically, horizontally, or combinations thereof may be utilized for large heat pump loads.

Since the heat exchanger loop components are modular, they can be more easily installed by a do-it-yourself homeowner, construction workers during the construction of a home or other building, remodelers, or the like without drilling equipment.

Figure 1A:
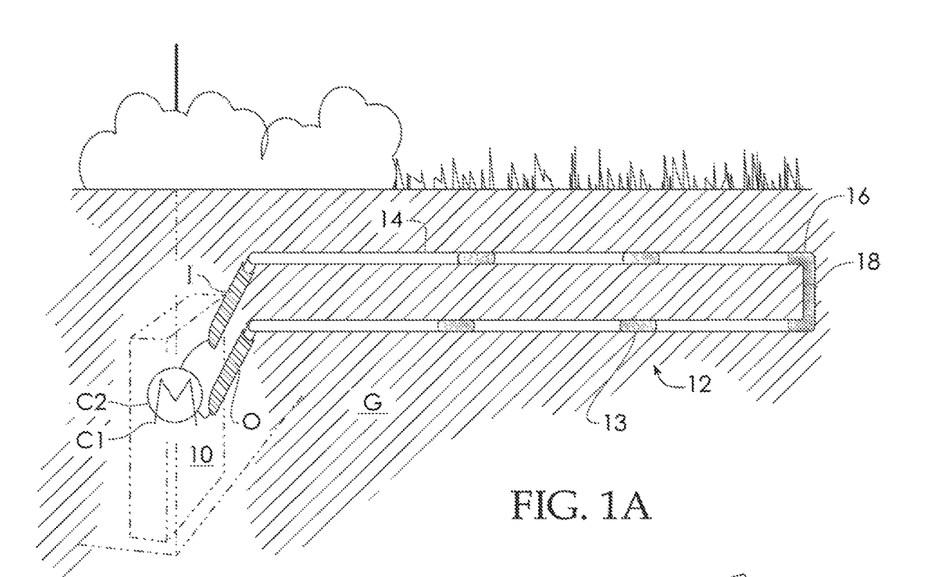
FIG. 1A is an environmental view of alternative embodiments of present design showing a building with the component configured as a U-shape.

An embodiment of the present design permits installation along the periphery of the foundation of a house with the conventional version or a single level of one pipe (the components are distributed around the periphery of a small footprint structure with the input and output being from opposite directions), or two adjacent pipes disposed apart two (2') feet minimum (the components are disposed in two lengths which return to the same location, see FIG. 1), where the house water down spouts may be used as soakers to maintain the moisture about the heat exchanger tubes.

The basic heat exchanger loop components and heat pump are compact enough that they could be utilized for heating/cooling temporary structure, e.g., military camps, refugee camps, and emergency hospital facilities. An embodiment of the present design permits the heat exchanger loop component to be merely covered by two (2') feet of fill allowing the unit to be placed on the ground and then buried.

The present invention makes ground source heat exchangers more economical, feasible, and accessible. Another aspect of the present design is to maximize the energy acceptance/rejection, and to minimize land area required for a ground source heat pump earth heat exchanger. The present design does not require the area or footprint of conventional ground source heat exchangers or of other conventional heat exchanger designs, and does not require the land or drilling resources for conventional excavations.

Yet another aspect of the present design takes advantage of the shallower depths, e.g., from twenty four (24") inches to thirty (30") in Charleston, W. Va., inches to provide more optimum thermal conductivity, convection, radiation, diffusivity, temperature gradients, moisture migration, evaporation, and to some extent biological transpiration (depending on soil vegetation).

Furthermore, the design of the present invention has a potential coefficient of performance (COP) of three (3) to five (5), and an energy efficiency ratio (EER) of eighteen (18). COP is the total Btu required to heat the building divided by the total Btu to run the heat pump. The EER is equal to the total Btu required to cool the building divided by 3.14 times 1000.

The heat exchangers of the present designs are low maintenance, will endure for a long time, and can be used to make all necessary domestic hot water. Additionally, the hot air produced at a heat register is 95° F. to 110° F., and the design can be used to heat indoor or outdoor swimming pools.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF PREFERRED EMBODIMENTS

Figure 1B:
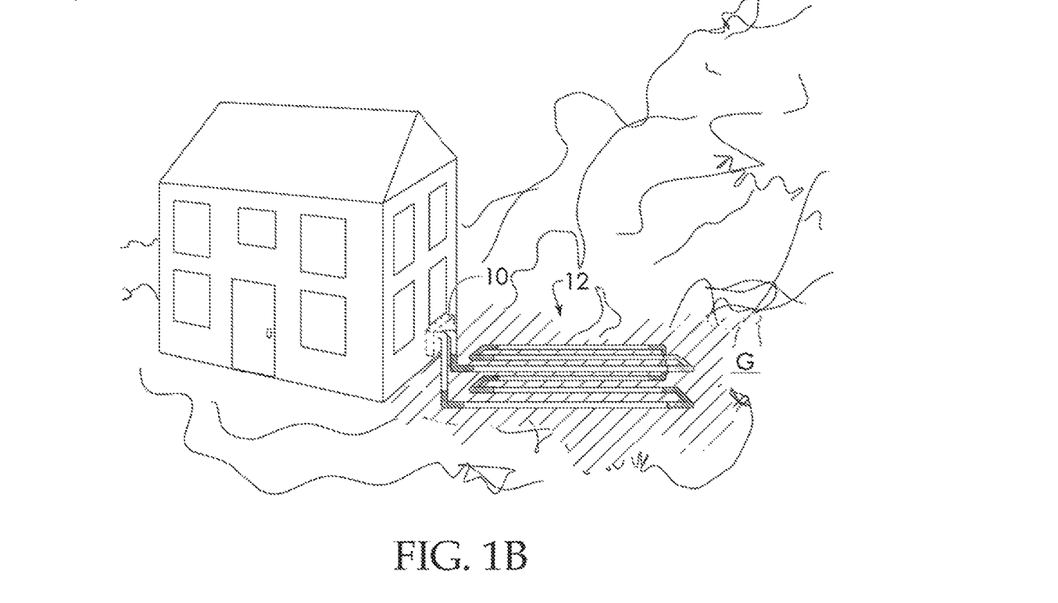
FIG. 1B is an environmental view of alternative embodiments of present design shows a home with heat exchanger component disposed in a hill.

The present invention is directed in part to a ground source heat pump heat exchanger 12 utilizing one or more small vertically or horizontally oriented water or antifreeze water mixture ground loop heat exchanger component(s) 12 which is disposed in the ground adjacent to a building as shown in FIG. 1A, or in close proximity to the ground surface adjacent to a house as shown in FIG. 1B. The embodiment of the heat exchanger 12, shown in FIG. 1A, is the simplest arrangements of the present invention in which two vertical layers of multiple long pipes 14 connected end to end by a straight connector 13 with a short pipe 18, and two corners 16 disposed at the distant end. All of the pipes 14, 18, connectors 13, and corners 16 are in fluid communication therethrough. The long pipes 14 are disposed of thermally conductive materials, e.g., aluminum, copper, iron and alloys thereof, or appropriate thermally conductive plastic/polymers.

The heat pump 10 may include any suitable heat pump design which are well known in the art, and may be conventional ground source heat pump. The present heat pump system, encompassing the heat pump 10 and the in ground heat exchanger 12 as shown in FIG. 1A utilizes two loops. The ground heat exchanger 12 is disposed underground or under packed down fill. In operation, the cooling mode disperse heat into the ground, while in heating mode heat is absorbed from the ground. A ground source heat exchanger 12 has two or more layers of horizontally oriented long pipes 14, which upon assembly are in closed fluid communication with output 17 and an input 15 terminuses. The output 17 and input 15 terminuses form a closed loop when attached to the corresponding output O and input I of the heat pump 10. Water, or antifreeze/water solution, is pumped through the closed loop to alternatively exchange heat with the ground or heat pump as appropriate. Alternatively, the pipes are spaced about two (2') feet apart to moderate undesirable heat transfer interference between pipes 18.

Figure 2:
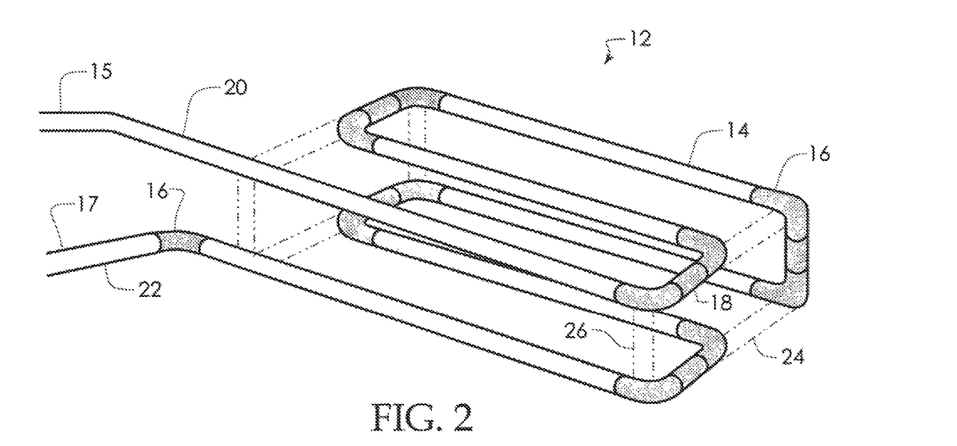
FIG. 2 shows a basic configuration of the components of the heat exchanger according to alternative embodiment of the present invention.
Figure 3:
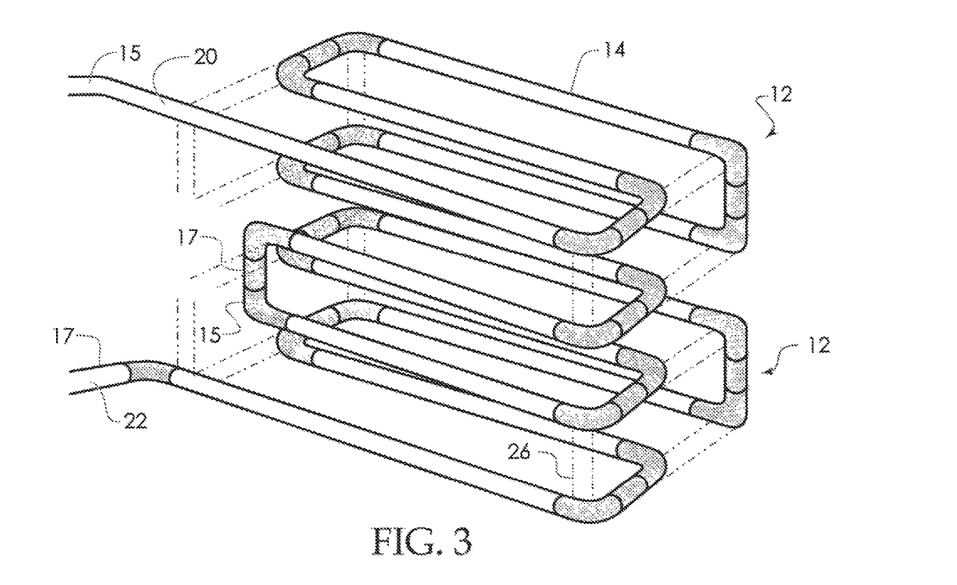
FIG. 3 shows a heat exchanger coil according to the present design composed of a combination of basic components of the heat exchanger.

A desirable basic embodiment of the present invention, used in the example of FIG. 2, incorporates six (6) twenty (20') foot long aluminum pipes with 3.5" outer diameter, and larger than about a three inch (3.0") inner diameter. FIG. 3 shows two basic embodiments of FIG. 2 combined for a larger unit, and FIGS. 4A through 4D show a basic structure in more detail. The long pipes 14 are placed two (2') feet apart on center, and connected together by two corners 16 and one short pipe 18 in series flow. Aluminum welded, and/or fuse welded High Density Polyethylene (HDPE) may be utilized as corner connectors 16 and short pipes 18 disposed between pipes 14. The piping system is then stabilized using supports placed to give maximum structural strength, the supports being two (2') long.

An embodiment has a pipe basket, or component 12, placed in an excavated ditch or a hole in the ground at a depth to allow the top of the basket to be twenty-four (24") inches to thirty (30") inches below the surface of the earth for conditions similar to those in Charleston, W. Va. The excavated ditch or hole, containing the pipe basket 12 disposed therein, is refilled with earth well compacted to insure maximum contact with the earth/pipe interface. A small perforated sprinkler, or soaker hose, may be placed at the top of the basket 12, and connected to a heat pump condensate line, house downspout, and/or other water supply, to insure proper soil/moisture concentrations that enhance heat transfer especially in the cooling season.

The fluid flowing through the heat exchanger 12 may be an antifreeze and water mixture, sufficient to protect from freezing down to fifteen (15° F.) degrees Fahrenheit or lower. The velocity will be such as to maintain turbulent flow at all times that maximizes heat transfer between the fluid and the pipe. Since most heat pump systems are two or three tons in size more than one of these baskets can be connected together in series to provide adequate heat transfer.

The bundle 12 is fitted together at a manufacturer as a discrete all-in-one basket, in a shop, or in the field from the components. The components may be sold separately or as a bundle in a kit to be put together in a shop or in the field. If not assembled at the manufacturer, the long pipes, short pipes, polyethylene fittings, connectors, corner connectors, and flexible pipes are fused together in a shop or in the field. The pipes and fittings are connected to each other using fitted ends, the sections may be butt connected, complimentary male/female threading, and the like, including any other well known or conventional means of connecting or fusing two pipes together to prevent leakage. Threaded connections and/or pipe ends plus a binder may be used.

The present design is not restricted to the particular dimension relationship shown in the figures, but may be arranged however is appropriate for the location. The long pipes 14 in the bundle may simply be disposed with one short pipe and two corner connectors, or no short pipes and four corner connectors (to circumnavigate a building and return to the heat pump 10 from opposing sides)—with straight connectors 13 disposed between long pipes 18.

The thermally conductive composition of the long pipes 14 is essential to shortening the overall length of the heat exchanger 12. For example, aluminum thermal conductivity is about one hundred twenty BTU/hr ° F. ft, while conventional plastic, e.g., for a HDPE pipe, is an insulator having a thermal conductivity of about 0.25 Btu/hr ° F. ft. A three (3") inch internal diameter and 3.5" outer diameter aluminum pipes may be optimum. The outside diameter of the pipes 14 is not particularly limited. Smaller size pipes will work. In some embodiments, the outside diameter of the pipes may range from about 0.75 inches to more than four (4) inches.

Pipes of a twenty (20') foot length are desirable for convenience of handling and transport, construction, and economy and because such pipes are standard sizes. A four (4') foot by four (4') foot trench that is twenty (20') feet long is desirable for the most compact version of the present invention. Three (3") inch internal diameter marine grade aluminum alloy pipes are also standard, and assure turbulent flow at twelve (12) GPM, and in some cases a mechanical or permanent fixture to assure turbulent flow (not shown), to provide a maximum heat flow rate from the fluid to the pipe. In some cases, a mechanical or permanent fixture to increase turbulent flow may be present. A condensate line may also be attached to the heat pump 10 to return water to the ground, and may be attached to a soaker line (not shown) disposed above or along the pipes 14 to assure moist soil in direct contact with the conductive pipe 14. In an embodiment of the present design, the pipes 18 have a 3.33" internal diameter.

The required heat flow between the ground and the heat exchanger 12 can be realized with multiple aluminum alloy pipes, but little additional benefits are realized with more than six (6) pipes per basket. Calculations show that comparatively, a two (2) pipe heat exchanger requires the shortest pipe length (168') but the longest trench (84') length, while a six pipe heat exchanger basket requires the longest pipe length (260') but the shortest trench length (43') for the ambient conditions in Charleston, W. Va.

Each long pipe 14 is connected to an adjacent long pipe 14 by two corner connectors 16, and one short pipe 18. The shorter pipes 18 may be composed of a thermally conductive material, or they may be composed of HDPE piping, or other flexible piping material that may or may not be thermally conductive. The corner connectors 16, and the shorter pipes 18, are preferably flexible so that upon placement in the ground G, the entire heat exchange component 12 may be malformed without leaking or breaking. This feature not only prevents the danger of breaking as ground settles, it facilitates filling in the space about the pipes 14 and 18 without fear of breaking them or having the fill be perfect. Settling of the fill dirt will not rupture the heat exchanger's 12 pipes 14 since the constructed line of pipes 14, 18 is flexible. With the relatively shallow depth of the pipes, the basket will not be damaged by the weight of the ground above them. In some embodiments of the present invention, the short pipes 18 will be composed of a more rigid thermally conductive material like the long pipes 14.

The heat exchanger 12 may be placed against the bottom of a cliff, hill, or other incline, and then be covered with fill instead of being buried, as shown in FIG. 1B. Furthermore, the heat exchanger 12 may be buried in the side of an incline, e.g., mountainside, hill, or the like, as long as the fill dirt covers the pipes 14, 18 to a minimum of about two (2') feet on all sides. It is also preferable for the heat exchanger 12 to be placed in a moist area. In more arid environments, underground sprinklers (not shown) may be used to maintain the moisture level about the exchanger 12 pipes 14, 18. Alternatively, or additionally, the heat exchanger 12 may be placed under the eaves of the roof line along the path of the down spouts, which may also be connected to or allowed to drain above the heat exchangers 12.

The heat exchanger 12 comprises a pipe bundle, which may be sold as a kit, containing a plurality of long pipes 14, which upon construction are in fluid communication with one another. The horizontal long pipes 14 may be configured in one or more layers positioned below one another, and are spaced a minimum of about two (2') feet apart. The long pipes 14 may be placed alternatively in a horizontal or vertical arrangement. The vertical installation requires a deeper area to be excavated, but would represent a smaller foot print on the ground surface. A further alternative arrangement involves, simply placing the heat exchanger component against a geological feature and burying it with at least two (2') feet on all sides.

With reference to FIG. 2, there is illustrated a horizontally oriented ground loop heat exchanger component 12 in accordance with alternative designs of the present invention having an upper and lower layer of long pipes 14, as shown. The horizontally oriented ground loop heat exchanger 12 includes a first layer of horizontally oriented long pipes 14 in fluid communication with one another. The first layer of long pipes 14 is positioned or installed about twenty-four (24") inches to about thirty (30") inches from the surface of the ground G. Further, the long pipes 14 are positioned at least about two (2') feet from one another. This spacing maximizes heat transfer with the ground G, while moderating thermal interference with adjacent long pipes 14.

Additional layers of horizontally oriented pipes 14 may be used. FIG. 2 illustrates two layers of three horizontally oriented long pipes 14 with a second layer positioned below the first layer of three horizontally oriented pipes 14. The first layer of horizontally oriented pipes 12 and the second layer of three horizontally oriented pipes 14 are in fluid communication with one another, altogether having a single input terminus 17 and single output terminus 15. The second layer of horizontally oriented pipes 14 is spaced at least about two (2) feet from the first layer of horizontally oriented long pipes 14.

While the FIG. 2 illustrates two layers of three horizontally oriented long pipes 14, more layers of horizontally oriented pipes may be utilized. FIG. 1A shows a single layer of long pipes 14, while FIG. 3 shows two components or baskets 12 of FIG. 2 depicted on top of one another in series so that one input terminus 17 and one output terminus 15 is present. It should be understood that the embodiments shown in FIGS. 2 and 3 may also be rotated ninety (90°) degrees so that the long pipes 14 are disposed vertically, and that combinations of vertical, horizontal, and diagonally (at an angle) disposed long pipes 14 are also possible. The out pipe 20 and the in pipe 22 are shown in FIGS. 2 and 3, and may be a nonconductive pipe 20, 22. An expansion tank (not shown) is typically provided to remove air from the closed tubing loop of the heat exchanger 12 and to facilitate the change in fluid volume due to thermal expansion and contraction.

The long pipes 14 making up the first and second layer of horizontally oriented long pipes 14 provide for a high rate of heat transfer between the fluid inside the pipe and the ground. In some embodiments, the pipes 14 are made of metal, including but not limited to, copper, aluminum, alloys of iron, such as steel, stainless steel, and combinations or alloys thereof. In other embodiments, the pipes may be made of carbon composites or polymer composite materials that provide for a high rate of heat exchange between the fluid inside the pipe and the ground.

The length of the horizontal long pipes 14 is not particularly limited and may be based upon the anticipated heat transfer requirements. In some embodiments, the horizontal long pipes 14 may range from about ten (10) feet to about forty (40) feet in length. In other embodiments, the length of the horizontal pipes 14 may be about twenty (20) feet in length. The short pipes 18 may be two (2) or three (3) feet long.

There will be a minor component of vertically extending short pipes 18 to fluidly connect the two or more layers of horizontal long pipes 14. It is anticipated that the overwhelming majority of ground loops will be oriented horizontally in typical applications, but the present invention is not limited thereby as there are embodiments of the current design in which the heat exchange component is merely placed upon the ground, hillside, or mountainside, and buried under two (2) feet of ground G cover or fill. In some embodiments, the horizontally oriented water/fluid ground loop heat exchanger 12 includes about one hundred twenty-eight (128') feet of horizontal pipe which is about sixty-four (64') feet in each layer, and about two (2') feet of vertical pipe, excluding the fluid inlet and fluid outlet piping leading to the horizontally oriented water/fluid ground loop heat exchanger 12.

In some embodiments, the installed long pipes 14 are a horizontally oriented water/fluid ground loop heat exchanger 12 exhibiting a ratio of horizontal piping to vertical piping ranging from about 32:1 to about 128:1. In other embodiments, the ratio of horizontal piping to vertical piping ranging is about 64:1. It is to be understood that in alternative embodiments, the long pipes 14 are vertically oriented and the short pipes 18 are horizontal. Furthermore, in some circumstances, such as temporary structures for camp facilities, temporary medical facilities, or the like, the pipes 14 may be oriented simply according to the lay of the land so that they are neither horizontal nor vertical, and covered by fill to the proper local specs for the season or seasons to be used. The inlet and outlet pipe 22 and 20 locations and lengths must clearly be adjusted accordingly.

In the simplest embodiment composed of two layers with one line of pipe(s) each, the horizontal long piping 14 is connected on end to other horizontal long piping 14 by a straight in line connection and may simply encircle the structure at least two (2) feet from the foundation in a well moistened area, at least two (2') feet from the surface of the ground G, in climates similar to Charleston, W. Va. In the embodiment depicted in FIG. 2, however, the horizontally oriented water/fluid ground loop heat exchanger 12 includes a fluid inlet 22 which may be a reducer to accommodate the use of smaller polyethylene pipe to convey the fluid from the heat pump 10 heat exchanger (not shown) to the ground heat exchanger 12 in which heat exchanging fluid such as water or other heat exchanging fluid enters the second layer of horizontally oriented pipes 14. The fluid travels through the second layer of horizontally oriented pipes 14 and then through the first layer of horizontally oriented pipes 14 and on through the outlet pipe 15 to the heat pump 10.

Heat is transferred between the heat exchanging fluid and the ground G as the fluid travels through the layers of horizontally oriented long pipes 14. The heat exchanging fluid then exits through a fluid outlet 20 which may be a reducer to accommodate the use of smaller polyethylene pipe to convey the fluid from the ground heat exchanger 12 to either additional bundles of heat exchangers 12 and then on to the heat pump 10 heat exchanger loop C2 or, directly to the heat pump 10 heat exchanger loop C2 where the heat exchanging fluid contacts the refrigerant carrying coil C1 of the heating or cooling system thereby exchanging heat between the heat exchanging fluid flowing through the heat exchanger C2 and the refrigerant coil C1 (using the appropriate ASHRAE Standard 34 refrigerant). The heat exchanger 12 has an input terminus 17 and an output terminus 15 for fluid communication with the input/output I/O of the heat pump 10.

Figure 4A:
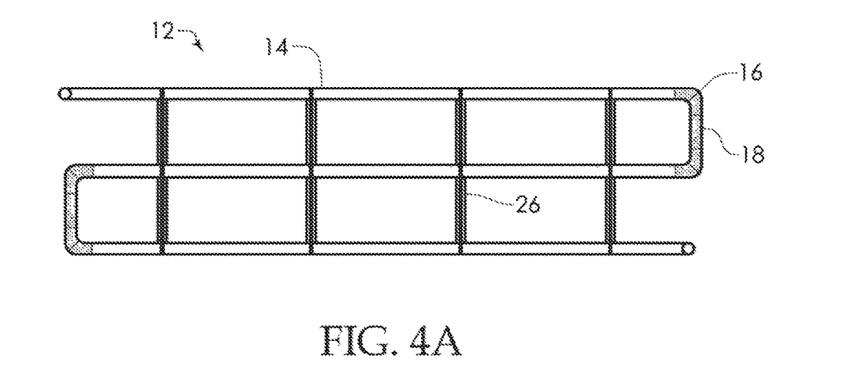
FIGS. 4A through 4D show a basic heat exchanger component coil and supports according to an alternative embodiment of the present design.
Figure 4B:
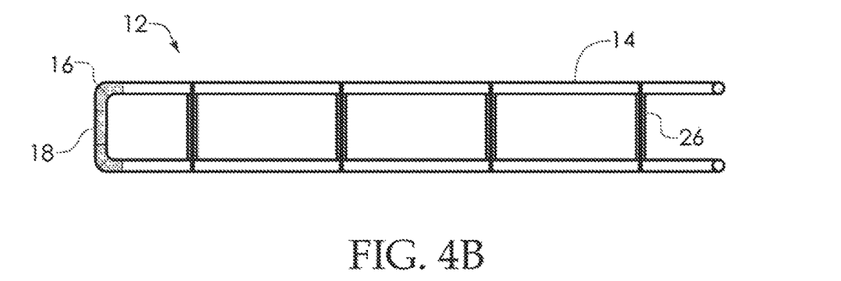
Figure 4C:
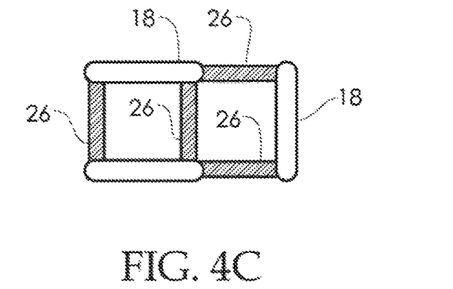
Figure 4D:
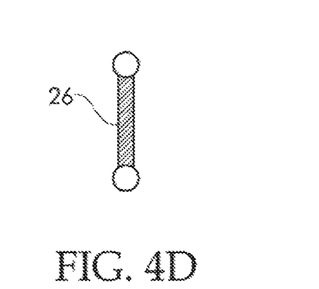

FIGS. 4A through 4D show a plan schematic of a favorite embodiment of the present design, representing a bundle, in which the basic ground loop heat exchanger 12 has two levels of long pipes 14 and short pipes 18 with six (6) lengths of long pipe 14 and five (5) lengths of short pipe 18. The bundles can be packaged and sold as a kit, with a heat pump 10 or as individual bundles. The three lengths of long pipe 14 are seen most clearly in FIG. 4A, while FIG. 4B shows the two levels. FIG. 4C shows the view from the end which demonstrates the location of the short lengths of pipes 18 and the braces 26. The corners 16 are omitted from 4C through 4D.

Braces 26 may be disposed regularly along the length to maintain the two (2') foot space between long pipes 14. The length of the long pipes 14 relative to the short pipes 18 are not drawn to scale with the long pipes 14 shown as much shorter. In a favorite embodiment of the present design, the long pipes 14 are twenty (20') feet long, and the short pipes 18 are two (2') feet long. The braces 26 are disposed every three (3') feet to four (4') feet along the length of the long pipes 14 from end to end.

Alternative embodiments of the present design may use longer or shorter lengths of long pipe 14, and the short pipe 18 may also be longer, but preferably not shorter unless the long pipes 14 are not disposed parallel to one another but instead are splayed so that the distance between long pipes 14 is at least two (2') feet apart (for Charleston, W. Va.) up to being disposed end to end in a substantial line.

Figure 5A:
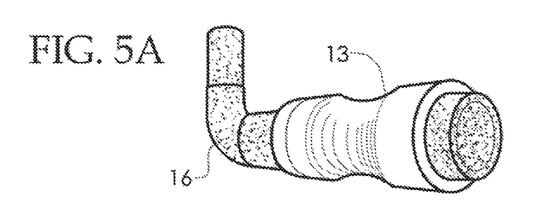
FIGS. 5A through 5C show perspective, side, and exploded views respectively of connector and pipe components according to an embodiment of the present design.
Figures 5B, 5C:
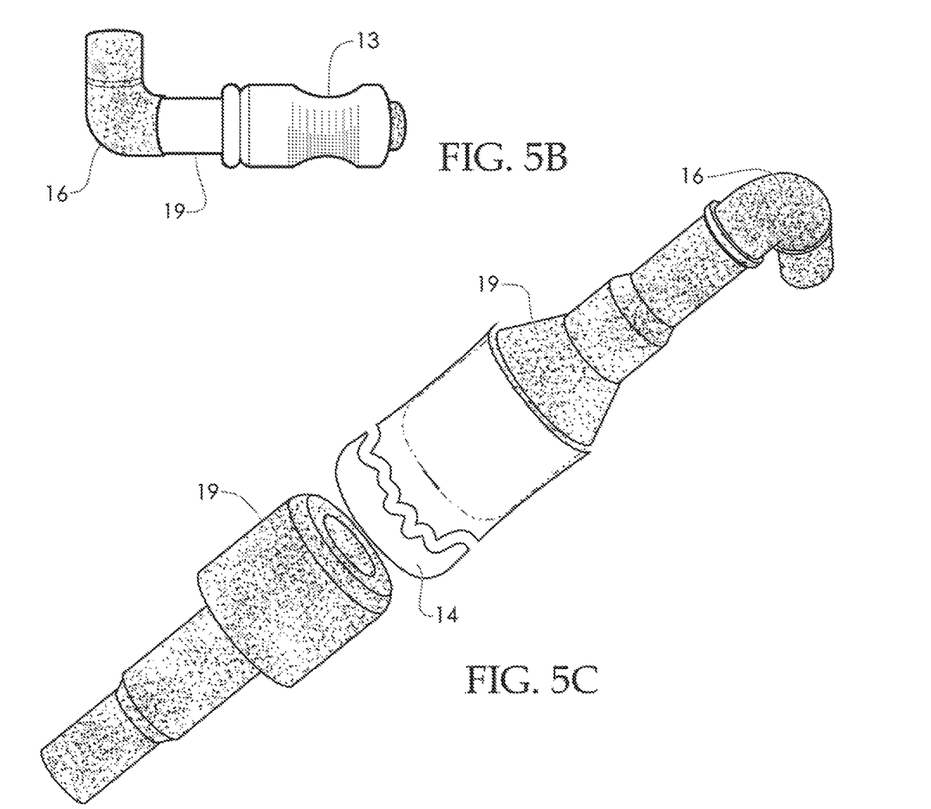

It may be desirable to have the corner connectors 16 pre attached to, or configured from, the short pipes 18. FIGS. 5A and 5B show two views of an alternative corner connection 16 arrangement. FIG. 5A is a perspective view of a butt joint.

FIG. 5B is a side view in which the pipes are joined butt together fitting in which the fitting is crimped to hold the pipe 14, 18 sections together. There is a space of about twenty (20") between the ends of the crimping clamp. FIG. 5C is a side exploded view of a pipe 14, 18 with an connector 13 that is an HDPE insert 19 which fits into each end of the pipe 14 or 18. Each end shows that the pipe diameter is enlarged due to the insert 19 being forcibly shoved mechanically into the pipe 14 or 18. One end shows the pipe crimped and the other end show the pipe and insert 19 without being crimped. Alternatively, the insert 19 can be installed into the pipe by cooling the insert 19 sufficiently to shrink its outside diameter so that it will fit into the inside diameter of the pipe and will be tightly sealed when the insert's 19 diameter expands due to the increased diameter of the insert 19 as it warms up to the ambient temperature.

Alternatively, the insert 19 may be installed into the end of the large 14 and small 18 aluminum pipe, or other pipe fitting or length of pipe, by cutting threads onto the outside of one end of the insert 19, cutting threads in the inside of an aluminum pipe end and screwing the HDPE insert 19 pipe into the threaded aluminum pipe end. Any HDPE pipe or fitting, such as, but not limited to, an elbow, reducer, tee, straight connector, or any other type of fitting, can be attached to the insert 19 by any type of joint connection device, including but not limited to butt fusion welding and threads, that seals the joint so that it won't leak under twice the operating pressure of the exchanger 12 fluid system.

In an embodiment of the present design, the horizontal three inch (3") aluminum ground heat exchanger long pipes 14 are connected in one of two alternative configurations, each using alternative physical connection methods. In the first, the pipes 14 are connected in an end to end line of long pipes 14. Alternative physical connection methods include, but not limited to, butt welding the ends of the aluminum long pipes 14 together, and installing an internal HDPE pipe insert 19 into each end of the aluminum long pipe 14 and connecting them to HDPE pipes. In the second, parallel long pipes 14 utilize the alternative physical connection methods that includes miter welding the ends of the long pipes 14 to two foot (2') long vertical or horizontal short pipes 18 to make the transition from one horizontal long pipe 14 pipe to another horizontal long pipe 14, or installing an internal HDPE pipe insert 19 into each end of the aluminum long pipe 14 and connecting them to HDPE pipes.

Figure 6A:
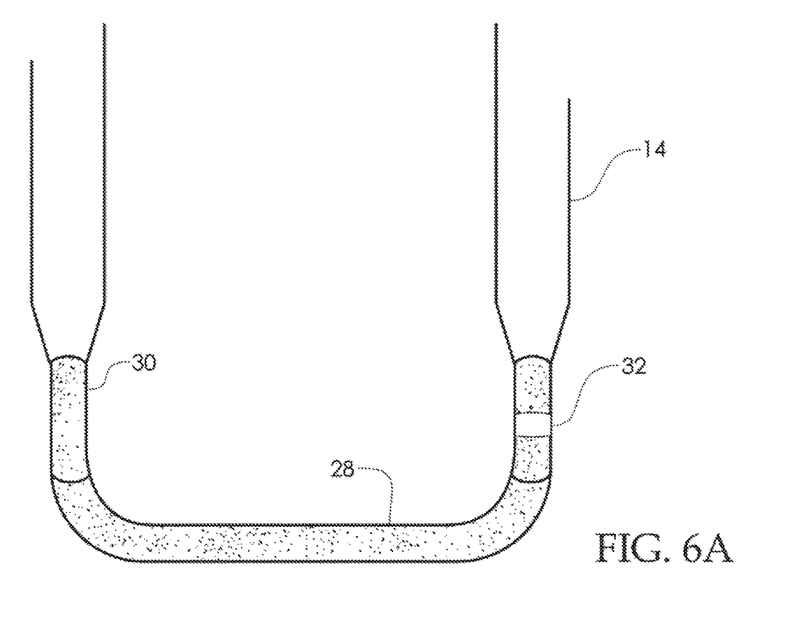
FIGS. 6A through 6C show side and perspective views of connector and short pipe components according to an embodiment of the present design.
Figures 6B, 6C:
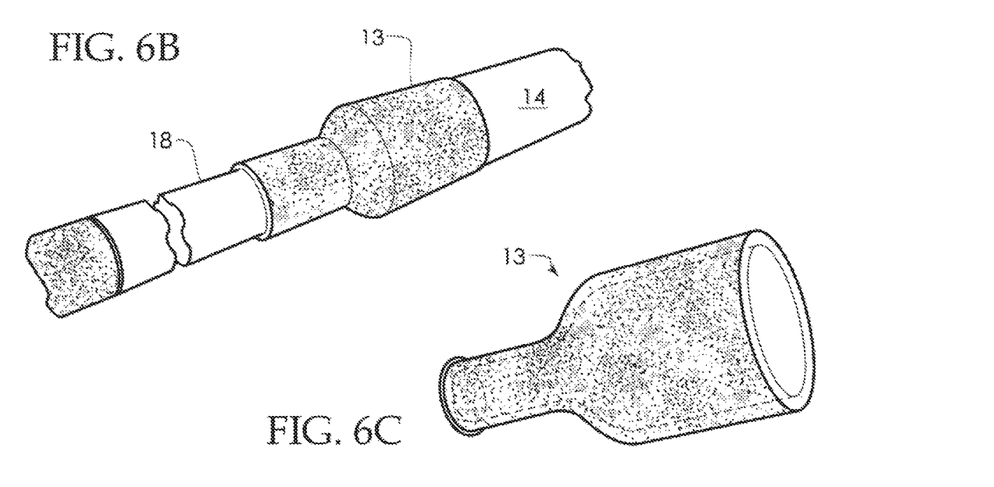

FIGS. 6A through 6C are elevated and environmental view of the short pipes 18 and corner connectors 16 relative to the ends of the thermally conductive long pipes 14. In detail, FIG. 6A shows a flexible short pipe 28, such as flexible high-density polyethylene tubes 28, which can be bent to mate with the ends of the long pipes 14. The ends of the long pipes 14 are narrower than along the length of the pipe 14 which may be about three (3") inches in diameter, as shown in the embodiment depicted therein.

The flexible short pipe 28 mates at 30 with the ends of the long pipes 14 over a space, six (6") inches in the embodiment shown, and then are bent into the proper shape. A clamp 32 may be used to secure the flexible pipe 28 about the end of the long pipe 14, as shown. FIG. 6B shows an alternative embodiment in which a reducer coupling connector 13 is provided upon the end of a long pipe 14 which a reducer coupling connector 13 is disposed on the end of each pipe 14, and 18 as shown in FIG. 6B. FIG. 6C shows the reducer coupling 13 by itself. The flexible short pipe 18 is then bent to the proper position or the bends can be prefabricated into the shape of the short pipe 18.

Figure 7:
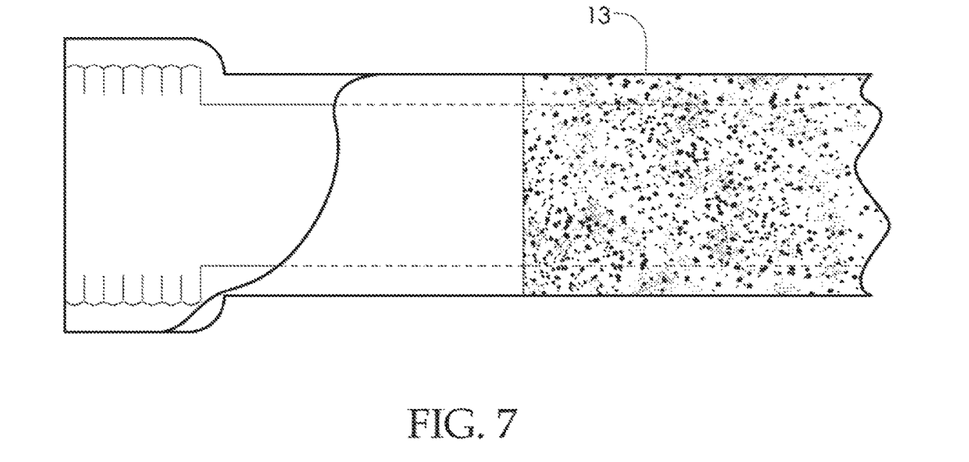
FIG. 7 is a pipe connection having internal threads to mate with a pipe having external threads.
Figure 8:
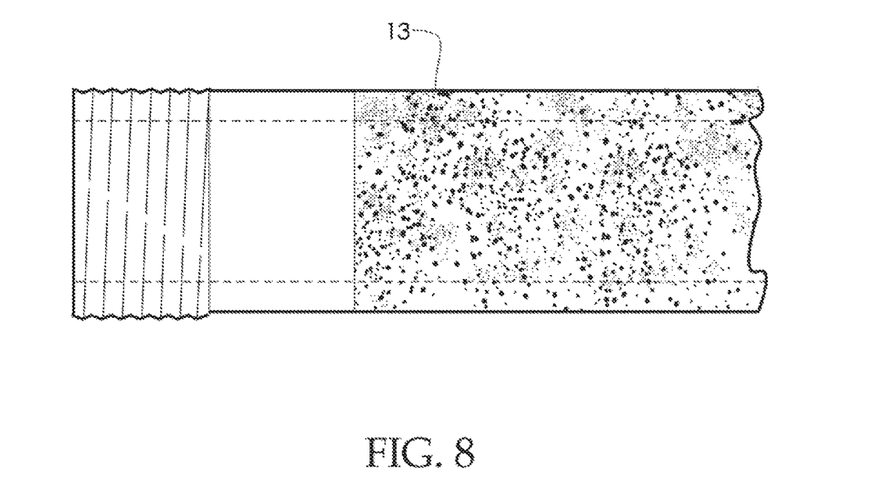
FIG. 8 is a pipe connection having external threads to mate with a pipe having internal threads, e.g., FIG. 7.

FIGS. 7 and 8 shows a threaded transition adaptor connector 13, U.S. Pat. No. 5,211,429 the contents of which are incorporated herein in their entirety and are available from Poly-Cam (Anoka, Minn.), in which the ends of the pipes 14, 18 have complementary inner and outer threads designed to mate by rotating one or the other pipe 14, 18. These mates are typically composed of metal or metal alloys, and may be disposed on the ends of either metal/metal alloy pipes used with the long pipes 14 or high-density polyethylene pipes used with the short pipes 18. A binder composition may be added to seal and bind the pipes 14, 18 and connectors 13 together. This transition adaptor connector 13, shown in FIGS. 7 and 8, is disposed where similar sized high-density polyethylene pipes 18 to metal pipes 14 are mated. The aluminum pipe 14 has a wall thickness of 0.83" with up to 20' long. A high-density polyethylene pipe connector 13 to connect to selected size of high-density polyethylene butt weld pipe or socket weld fittings which are well known in the art. Seal joints with either friction fit or pipe crimp stainless steel pipe clamp are also options as are well known in the art. Well known alternative sealing connectors between adjacent pipes, and corner connectors, may be utilized.

Figure 9:
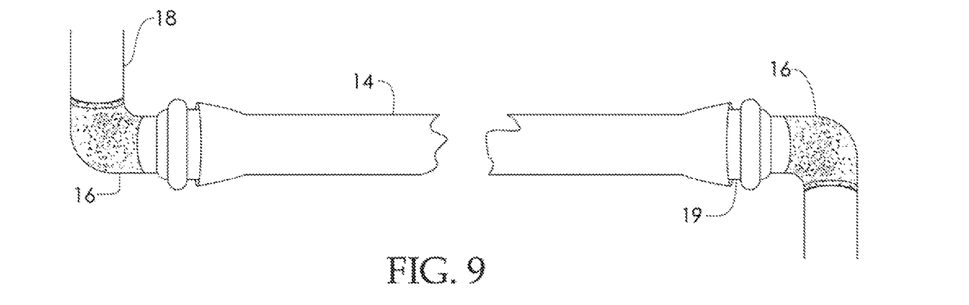
FIG. 9 is a side view of a long to short pipe with connector.
Figure 10:
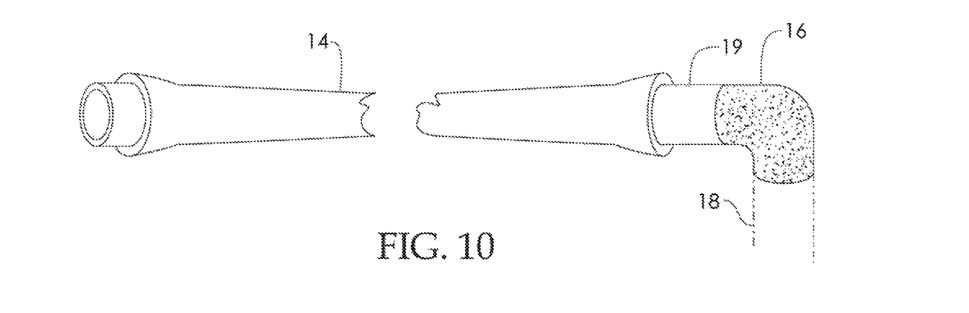
FIG. 10 is a side view of another long to short pipe with connector mechanism shown.

FIG. 9 shows yet another alterative in which the corner connectors 16 are flexible, such as a flexible high-density polyethylene that is connected to another element which can then be butt welded in position, or the like. FIG. 10 shows another embodiment of a butt welded pipe. The flayed ends are a demonstration of the malformation of the pipe once it is fitted over the adjacent pipe.

Without intending to be bound by theory, it is believed that several physical processes interact positively with a ground heat exchanger 12 at a depth relatively close to the ground surface, i.e., conduction, convection, radiation, moisture migration, evaporation, and to some extent biological transpirations (depending on type of soil vegetation), and combinations thereof.

Another embodiment of the present design may include one or more of a plurality of water soaker or sprinkler pipes to enhance the heat exchange process, and to assure ground containing water. The water soaker pipes are positioned between the surface of the ground and the water/fluid ground loop heat exchanger, or simply along the length of the heat exchanger pipes 14. The water soaker pipes may be installed to facilitate saturating the ground around the heat exchanger bundle with water during the short period of the maximum heating load, and particularly during the short periods of the maximum cooling load, when moisture migrates away from the pipes, to maximize the thermal conductivity of the soil, and the heat transfer capacity of the bundle. Installation of the ground loop exchanger 12 of the present invention is simple and only requires simple earth moving equipment. Due to the horizontal orientation in most applications, and close proximity of the ground loop heat exchanger 12 to the surface of the ground, specialized drilling equipment and associated muddy water ground surface pollution is avoided.

It is to be understood that the present invention is not limited to the embodiments described above, but encompasses any and all embodiments within the scope of the following claims.

What is claimed is:

1. A heat exchanger for use with a heat pump system in which the heat pump system has a heat pump with a refrigerant carrying coil to which the heat exchanger exchanges in ground heat using water or water-antifreeze fluids pumped through a heat exchanger loop in the heat pump, in which the heat exchanger loop has an input/output extending from the heat pump in fluid communication with the heat exchanger forming a closed loop, the heat exchanger comprising:
- input and output terminuses for fluid communication with the input/output extending from the heat pump in series or in parallel with
- at least two lengths of thermally conductive aluminum or aluminum alloy long pipes, including an input long pipe extending from the input terminus and an output long pipe extending from the output terminus;
- each of the long pipes being spaced at least two feet (2') apart from any other long pipe and connected on end with at least a pair of connectors, the pair of connectors having a short length of short pipe disposed therebetween; wherein
- a total combined length of the aluminum or aluminum alloy long pipes does not exceed one hundred twenty (120) feet between input and output terminuses;
- the long pipes have an outer diameter, the outer diameter being from about three (3) inches to about four (4) inches, and
- the connectors and short pipe are composed of thermally conductive material, HDPE, flexible material, or combinations thereof, wherein
- the thermally conductive material is taken from the group consisting of aluminum, copper, iron, or alloys thereof; and wherein
- the heat exchanger consists essentially of six long pipes disposed in parallel in which a layer of three parallel long pipes forming a row are disposed above a layer of three parallel long pipes forming a row, with five short pipes connected therebetween by the pairs of connectors to define the heat exchanger having upper and lower rows of the long pipes connected via the short pipes and the pairs of connectors, with each of the long pipes in the upper row disposed from about two (2) to about three (3) feet above a long pipe in the lower row.

2. The heat exchanger of claim 1, wherein:
the at least one of the pair of connectors alternately consists of straight connectors, flexible connectors, angled connectors, corner adapters, transition adapters to connect pipes and connectors of different diameters, or combinations thereof.

3. The heat exchanger of claim 1, further comprising:
braces disposed between layers of long pipe to maintain separation therebetween.

4. The heat exchanger of claim 1, wherein:
the heat exchanger is connected at the input terminus and/or the output terminus to at least another adjacent heat exchanger forming larger and larger matrices of heat exchangers.

5. The heat exchanger of claim 1, wherein:
the connectors are joined to pipe or other connectors by being butt adapted, threaded, crimped, clamped, friction welded, or combinations thereof.

6. The heat exchanger of claim 1, wherein:
each long pipe has an internal diameter of about three (3) inches.

7. The heat exchanger of claim 1, wherein:
at least one of the connectors or short pipes are composed of HDPE.

8. The heat exchanger of claim 1, wherein:
the long pipes are about twenty (20') feet long.

9. A heat exchanger for use with a heat pump system in which the heat pump system has a heat pump with a refrigerant carrying coil to which the heat exchanger exchanges in ground heat using water or water-antifreeze fluids pumped through a heat exchanger coil in the heat pump, in which the heat exchanger coil has an input/output extending from the heat pump in fluid communication with the heat exchanger, the heat exchanger comprising:
- input and output terminuses for fluid communication with the input/output extending from the heat pump in series or in parallel with
- at least two lengths of long pipes, including an input long pipe extending from the input terminus and an output long pipe extending from the output terminus;
- each of the long pipes being spaced at least two feet (2') apart from any other long pipe and connected on end with at least a pair of connectors, the pair of connectors having a short length of short pipe disposed therebetween; wherein
- the long pipes have an outer diameter, the outer diameter being from about three (3) inch to about four (4) inches,
- the long pipes are composed of a thermally conductive material taken from the group consisting of aluminum, copper, iron, or alloys thereof, and
- the connectors and short pipe are composed of HDPE.

10. The heat exchanger of claim 9, wherein:
the thermally conductive material is taken from the group consisting of aluminum or aluminum alloys.

11. The heat exchanger of claim 9, wherein:
the heat exchanger consists essentially of six long pipes disposed in parallel in which a layer of three parallel long pipes forming a row are disposed above a layer of three parallel long pipes forming a row, with five short pipes connected therebetween by the pair of connectors to define the heat exchanger having upper and lower rows of the long pipes connected via the short pipes and the pairs of connectors, with each of the long pipes in the upper row disposed from about two (2) to about three (3) feet above a long pipe in the lower row.

12. The heat exchanger of claim 11, further comprising:
braces disposed between layers of long pipe to maintain separation therebetween.

13. The heat exchanger of claim 11, wherein:
the heat exchanger is configured at the input terminus and/or the output terminus to connect to adjacent heat exchangers for forming larger and larger matrices of heat exchangers.

14. The heat exchanger of claim 11, wherein:
the heat exchanger is configured at the input terminus and/or the output terminus to connect to adjacent heat exchangers for forming larger and larger matrices of heat exchangers.

15. The heat exchanger of claim 9, wherein:
the at least one of the pair of connectors alternately consists of straight connectors, flexible connectors, angled connectors, corner adapters, transition adapters to connect pipes and connectors of different diameters, or combinations thereof.

16. The heat exchanger of claim 9, wherein:
the long pipes have a combined length of six lengths of pipe at 20 feet long for a total of 120 feet of thermally conductive piping per heat exchanger.

17. A heat exchanger for use with a heat pump system in which the heat pump system has a heat pump with a refrigerant carrying coil to which the heat exchanger exchanges in ground heat using water or water-antifreeze fluids pumped through a heat exchanger loop in the heat pump, in which the heat exchanger loop has an input/output extending from the heat pump in fluid communication with the heat exchanger, the heat exchanger comprising:

input and output terminuses for fluid communication with the input/output extending from the heat pump heat exchanger loop in series or in parallel with six lengths of thermally conductive aluminum or aluminum alloy long pipes, including an input long pipe extending from the input terminus and an output long pipe extending from the output terminus;

each of the long pipes being spaced at least two feet (2') apart from any other long pipe and connected on end with at least a pair of connectors, the pair of connectors having a short length of short pipe disposed therebetween; wherein a total combined length of the aluminum or aluminum alloy long pipes does not exceed about one hundred twenty (120') feet between input and output terminuses;

the long pipes have an outer diameter, the outer diameter being from about three (3") inches to about four (4") inches, and the connectors and the short pipe are composed of high-density polyethylene (HDPE);

wherein:

the aluminum or aluminum alloy long pipes are disposed in parallel which a layer of three of the parallel long pipes forming a row are disposed above a layer of three of the parallel long pipes forming a row, with five of the short pipes connected therebetween by the pairs of connectors to define the heat exchanger having upper and lower rows of the long pipes connected via the short pipes and the pairs of connectors, with each of the long pipes in the upper row disposed from about two (2) to about three (3) feet above each of the long pipes in the lower row.

18. The of claim 17, further comprising:

braces disposed between layers of long pipe to maintain separation therebetween.

19. The heat exchanger of claim 17, wherein:

the at least one of the pair of connectors alternately consists of straight connectors, flexible connectors, angled connectors, corner adapters, transition adapters to connect pipes and connectors of different diameters, or combinations thereof.

* * * * *